United States Patent
Owejan et al.

(10) Patent No.: US 9,153,826 B2
(45) Date of Patent: Oct. 6, 2015

(54) BIPOLAR PLATE WITH FEATURES FOR MITIGATION OF EXIT WATER RETENTION

(75) Inventors: Jon P. Owejan, Honeoye, NY (US);
Jeffrey A. Rock, Fairport, NY (US);
Steven J. Spencer, Rochester, NY (US);
Thomas A. Trabold, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1543 days.

(21) Appl. No.: 12/244,992

(22) Filed: Oct. 3, 2008

(65) Prior Publication Data

US 2010/0086820 A1  Apr. 8, 2010

(51) Int. Cl.
*H01M 8/02* (2006.01)
*H01M 8/04* (2006.01)
*H01M 8/10* (2006.01)

(52) U.S. Cl.
CPC .......... *H01M 8/0297* (2013.01); *H01M 8/0258* (2013.01); *H01M 8/0267* (2013.01); *H01M 8/04291* (2013.01); *H01M 8/1002* (2013.01); *Y02E 60/521* (2013.01)

(58) Field of Classification Search
CPC ........................................ H01M 8/02–8/04291
USPC .................. 429/452, 467–470, 479, 517–522
See application file for complete search history.

(56) References Cited

U.S. PATENT DOCUMENTS

| 4,678,724 A * | 7/1987 | McElroy ....................... 429/434 |
| 6,174,616 B1 * | 1/2001 | Marvin et al. ................. 429/443 |
| 6,495,278 B1 * | 12/2002 | Schmid et al. ................ 429/465 |
| 6,503,653 B2 * | 1/2003 | Rock ............................. 429/434 |
| 2002/0127461 A1 * | 9/2002 | Sugita et al. .................... 429/35 |
| 2003/0124405 A1 * | 7/2003 | Rock ............................... 429/34 |
| 2005/0175883 A1 * | 8/2005 | Trabold et al. .................. 429/38 |
| 2006/0228616 A1 * | 10/2006 | Chen et al. ...................... 429/38 |
| 2007/0042254 A1 | 2/2007 | Wozniczka et al. |
| 2007/0154744 A1 * | 7/2007 | Darling et al. ................. 429/13 |
| 2008/0096086 A1 * | 4/2008 | Ogawa et al. ................... 429/34 |
| 2009/0325036 A1 * | 12/2009 | Blank et al. ..................... 429/38 |

FOREIGN PATENT DOCUMENTS

| WO | WO 2007062639 A2 * | 6/2007 | ............. H01M 8/02 |
| WO | WO 2007089003 A2 * | 8/2007 | ............. H01M 8/02 |

OTHER PUBLICATIONS

Rye et al.—The Flow of Liquids in Surface Grooves Langmuir 1996, 12: 555-565.

* cited by examiner

*Primary Examiner* — Jonathan Crepeau
*Assistant Examiner* — Jacob Buchanan
(74) *Attorney, Agent, or Firm* — Fraser Clemens Martin & Miller LLC; James D. Miller

(57) ABSTRACT

A fuel cell plate having a first plate having an inlet aperture and a second plate disposed against the first forming a conduit. The conduit has a continuous seam formed between the first plate and the second plate to facilitate a transport of water to the outlet aperture. The plates can include various indentations and protuberances that form portions of the conduit. The fuel cell plate is well suited for use in a vehicle fuel cell stack for reducing water retention in a fuel cell without increasing the number of required components and fabrication cost of the fuel cell plate.

16 Claims, 5 Drawing Sheets

BIPOLAR PLATE WITH FEATURES FOR MITIGATION OF EXIT WATER RETENTION

FIELD OF THE INVENTION

The invention relates to fuel cells, and more particularly to a fuel cell plate having features that militate against liquid retention at bipolar plate inlets and outlets.

BACKGROUND OF THE INVENTION

Fuel cell power systems convert a fuel and an oxidant to electricity. One type of fuel cell power system employs a proton exchange membrane (hereinafter "PEM") to catalytically facilitate reaction of the fuel (such as hydrogen) and the oxidant (such as air or oxygen) to generate electricity. Water is a byproduct of the electrochemical reaction. The PEM is a solid polymer electrolyte that facilitates transfer of protons from an anode electrode to a cathode electrode in each individual fuel cell of a stack of fuel cells normally deployed in a fuel cell power system.

In the typical fuel cell stack, the individual fuel cells have fuel cell plates with channels, through which various reactants and cooling fluids flow. Fuel cell plates may be unipolar, for example. A bipolar plate may be formed by combining a plurality of unipolar plates. Movement of water from the channels to an outlet header and through a tunnel region formed by the fuel cell plates is caused by the flow of the reactants through the fuel cell assembly. Boundary layer shear forces and the reactant pressure aid in transporting the water through the channels and the tunnel region until the water exits the fuel cell through the outlet header.

A membrane-electrolyte-assembly (MEA) is disposed between successive plates to facilitate the electrochemical reaction. The MEA includes the anode electrode, the cathode electrode, and an electrolyte membrane disposed therebetween. Porous diffusion media (DM) are positioned on both sides of the MEA, facilitating delivery of reactants, typically hydrogen and oxygen from air, for an electrochemical fuel cell reaction.

Water must not be allowed to accumulate within the tunnel regions of the fuel cell because of a resulting poor performance of the fuel cell. Water accumulation causes reactant flow maldistribution in individual fuel cell plates and within the fuel cell stack. Additionally, water remaining in a fuel cell after operation may solidify in sub-freezing temperatures, creating difficulties when the fuel cell needs to be restarted. Prior solutions for effectively removing water from a fuel cell have led to increased manufacturing costs and the use of additional components.

Numerous techniques have been employed to remove water from the tunnel regions of the fuel cell. These techniques include pressurized purging, gravity flow, and evaporation. A pressurized gas purge at shutdown may be used to effectively remove water from the tunnel regions of fuel cells. Conversely, this purge increases required shutdown time of the stack and wastes fuel. Positioning of the stack appropriately may allow gravitational forces to remove water from the tunnel regions. Gravitational removal of water may be limited to tunnels having at least a certain diameter. Capillary forces of the conduit and corner wetting by the well known Concus-Finn condition militate against gravitational removal of water. Water removal by evaporation is an insufficient technique as well. Evaporation may require costly heaters and may lead to an undesirable drying of the electrolyte membrane. A dry fuel cell stack militates against proton conduction and prompt starting.

The use of water transport structures and surface coatings are two methods that also allow the tunnel region of a fuel cell plate to transport water into a header region of the fuel cell stack.

Water transport structures, typically in the form of hydrophilic or hydrophobic foam, may be incorporated within the bipolar plate. Water transport structures may be disposed between an active region of the fuel cell and the outlet header. Water transport structures improve removal of liquid water from a fuel cell through a capillary action. While beneficial to the operation and a restart time of the fuel cell, adding water transport structures to the fuel cell stack increases the number of components required to form the bipolar plate. Fabrication and assembly costs of the fuel cell stack subsequently increase when components are added.

Surface coatings may also be used to facilitate a removal of water from the fuel cell. Hydrophobic or hydrophilic surface coatings may be used to increase or decrease the surface contact angle of the bipolar plate, aiding the ability of reactant boundary layer shear forces and pressure to remove water from within the fuel cell. Hydrophobic surface coatings may also be used to militate against a film of water from forming. Coating precursors may be applied to the bipolar plate by spraying, dipping, or brushing, and formed into a hydrophobic or hydrophilic surface coating by secondary operations. Alternately, the coatings may be directly applied. While being less complex and expensive than water transport structures, surface coatings increase the fabrication costs of the bipolar plate.

There is a continuing need for a cost effective fuel cell plate that facilitates a transport of water through the tunnel region of a fuel cell that is inexpensive, minimizes the number of required components, and simplifies plate manufacture.

SUMMARY OF THE INVENTION

Presently provided by the invention, a cost effective fuel cell plate that facilitates a transport of water through the tunnel region of the fuel cell plate that minimizes the number of required components, and simplifies plate manufacture, is surprisingly discovered.

In one embodiment, the fuel cell plate comprises a first plate having an inlet aperture, and a second plate abutting the first plate and forming a conduit therebetween, the conduit in fluid communication with the inlet aperture and an outlet aperture of the fuel cell plate, the conduit having a continuous seam formed between the first plate and the second plate to facilitate a transport of water to the outlet aperture.

In another embodiment, the fuel cell comprises a pair of fuel cell plates, one of the fuel cell plates including a first plate having an inlet aperture, and a second plate abutting the first plate and forming a conduit therebetween, the conduit in fluid communication with the inlet aperture and an outlet aperture of the fuel cell plate, the conduit having a continuous seam formed between the first plate and the second plate to facilitate a transport of water to the outlet aperture, and an electrolyte membrane and a pair of electrodes disposed between the pair of fuel cell plates.

In another embodiment, the fuel cell stack comprises a plurality of fuel cells, one of the cells having a pair of fuel cell plates, one of the fuel cell plates including a first plate having an inlet aperture, and a second plate abutting the first plate and forming a conduit therebetween, the conduit in fluid communication with the inlet aperture and an outlet aperture of the fuel cell plate, the conduit having a continuous seam formed between the first plate and the second plate to facilitate a transport of water to the outlet aperture, and an electrolyte membrane and a pair of electrodes disposed between the pair of fuel cell plates.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
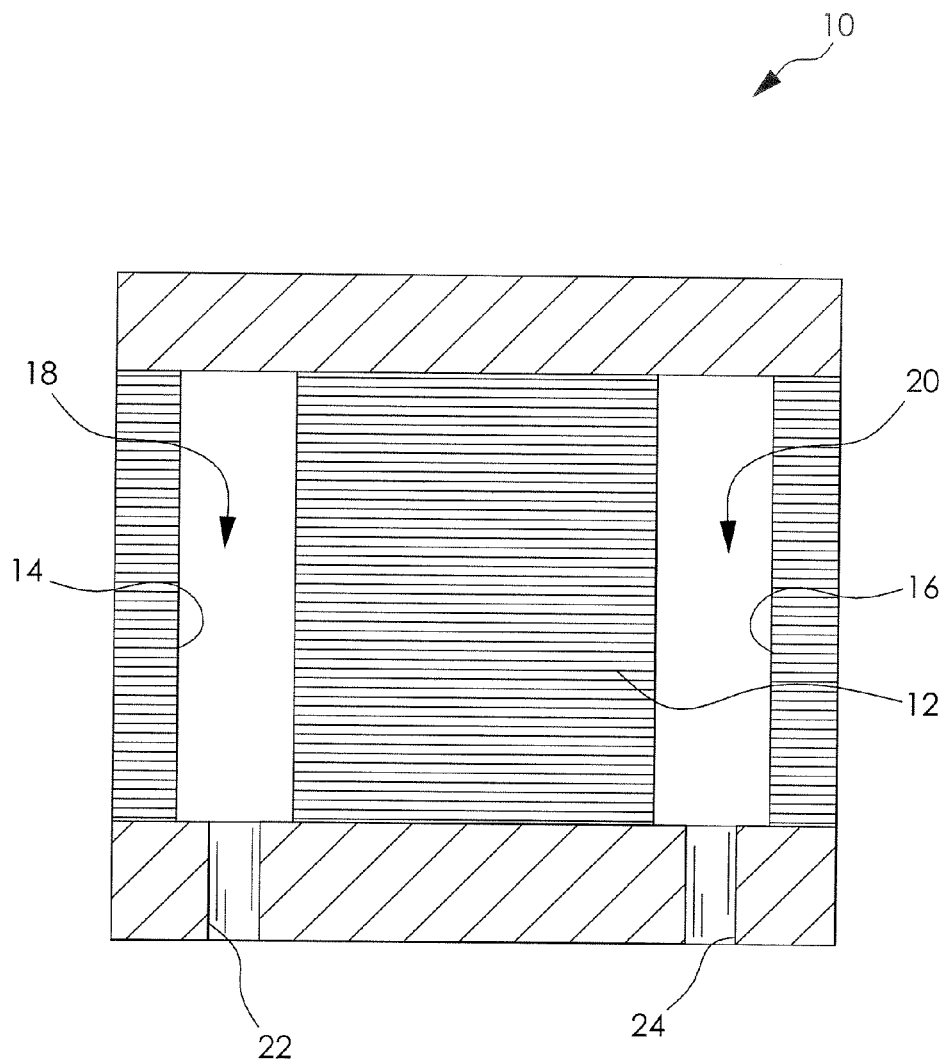
FIG. 1 is a cross-sectional view of a fuel cell stack according to an embodiment of the invention.

FIG. 1 shows a fuel cell assembly 10 according to an embodiment of the present disclosure. The fuel cell assembly 10 includes a plurality of stacked fuel cell plates 12. Each of the fuel cell plates 12 includes an inlet port 14 and an outlet port 16. Collectively, the inlet ports 14 of each of the fuel cell plates 12 form an inlet header 18 and the outlet ports 16 of each of the plates form an outlet header 20. An inlet 22 is in fluid communication with the inlet header 18 and an outlet 24 is in fluid communication with the outlet header 20. The fuel cell assembly 10 shown in FIG. 1 is illustrative of an anode inlet header and anode outlet header, a cathode inlet header and cathode outlet header, and a coolant inlet header and coolant outlet header.

Figure 2:
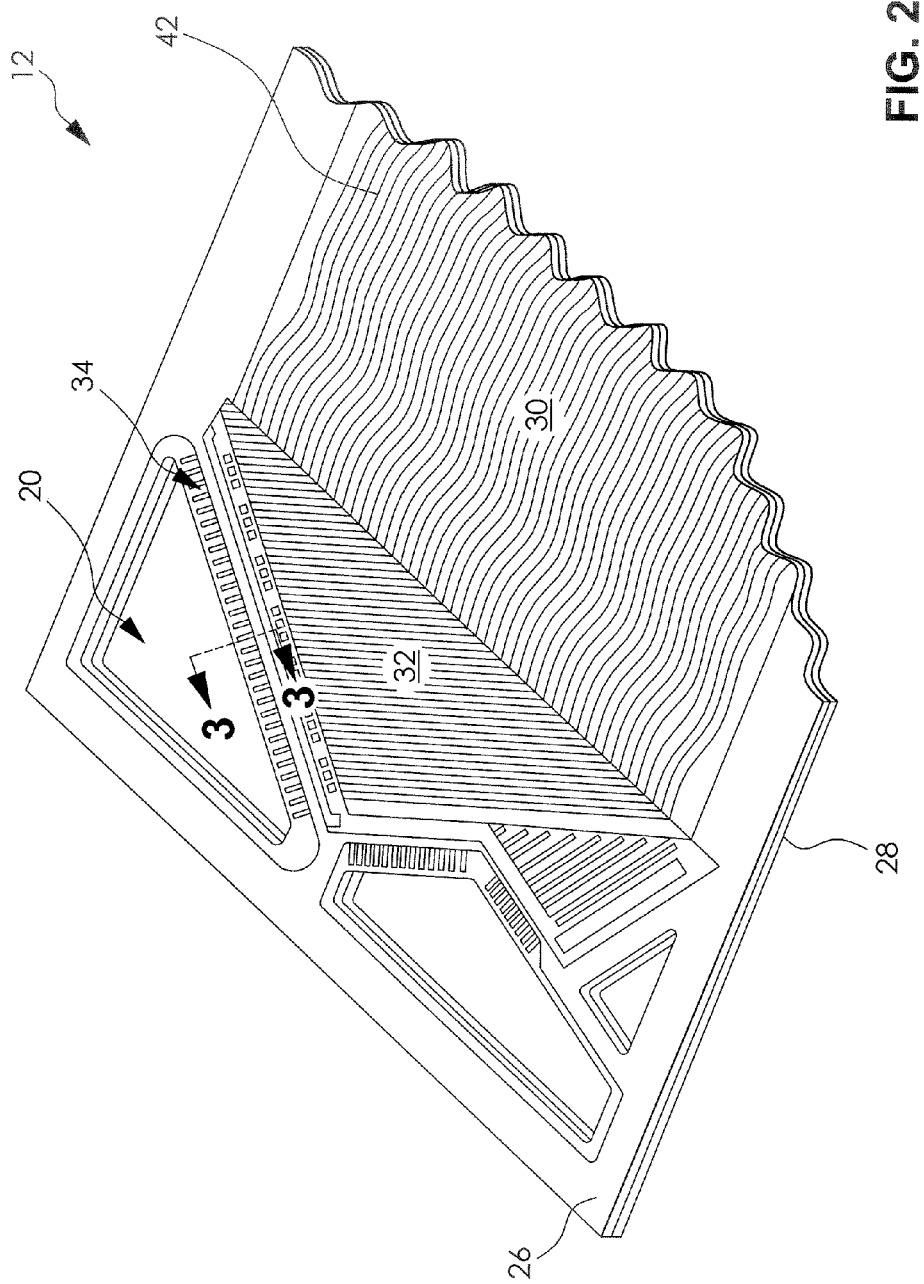
FIG. 2 is a fragmentary perspective view of a fuel cell plate from the fuel cell stack shown in FIG. 1.

FIG. 2 shows one of the fuel cell plates 12, which includes a first plate 26 and a second plate 28. The first plate 26 and the second plate 28 both include active regions 30 and inactive regions 32. The first plate 26 and the second plate 28 may be formed from any conventional material such as stamped metal, graphite, or a carbon composite, for example. It is understood that the material of construction, size, shape, quantity, and type of fuel cell plates 12 in the fuel cell assembly 10, and the configuration of the fuel cell plates 12 within the assembly 10, may vary based on design parameters such as the amount of electricity to be generated, the size of the machine to be powered by the fuel cell assembly 10, the desired volumetric flow rate of gases through the fuel cell assembly 10, and other similar factors, for example.

The second plate 28 is disposed adjacent the first plate 26 and bonded thereto by any conventional means, such as welding, an adhesive, and the like to form the fuel cell plate 12.

Disposing a membrane electrode assembly and a diffusion media between two successive fuel cell plates 12 forms an individual fuel cell. One of the first plate 26 and second plate 28 may be used for an anode side or for a cathode side of the fuel cell assembly 10. The first plate 26 and second plate 28 may be spaced apart, and a coolant channel existing therebetween may be used for liquid cooling of the fuel cell or for creating a tunnel region 34.

The tunnel region 34 allows for reactants and water produced during the electrochemical reaction to enter the fuel cell from the inlet header 18 and exit the cell to the outlet header 20. Features defining the tunnel regions 34 are integrally formed in the first plate 26 and the second plate 28. The tunnel regions 34 are separated from the coolant channels through the use of welds or adhesives selectively joining the plates 26, 28. As shown in FIGS. 3, 4, 5, and 6, the fuel cell plate 12 may have a number of conduits 36 formed between the first plate 26 and the second plate 28 to collectively form the tunnel region 34. The conduits 36 may be formed along a linear edge of the outlet aperture 16 or may be formed annularly around a substantially circular aperture, for example. The tunnel regions 34 may be formed around one of the inlet header 18 and outlet header 20.

Figure 3:
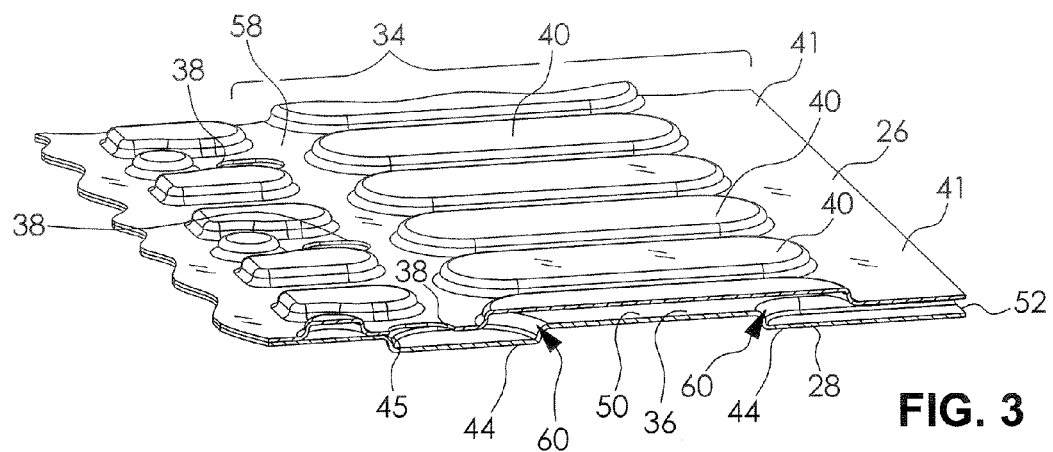
FIG. 3 is an enlarged fragmentary perspective view of the fuel cell plate illustrated in FIG. 2 showing a portion in section taken along section line 3-3.
Figure 4:
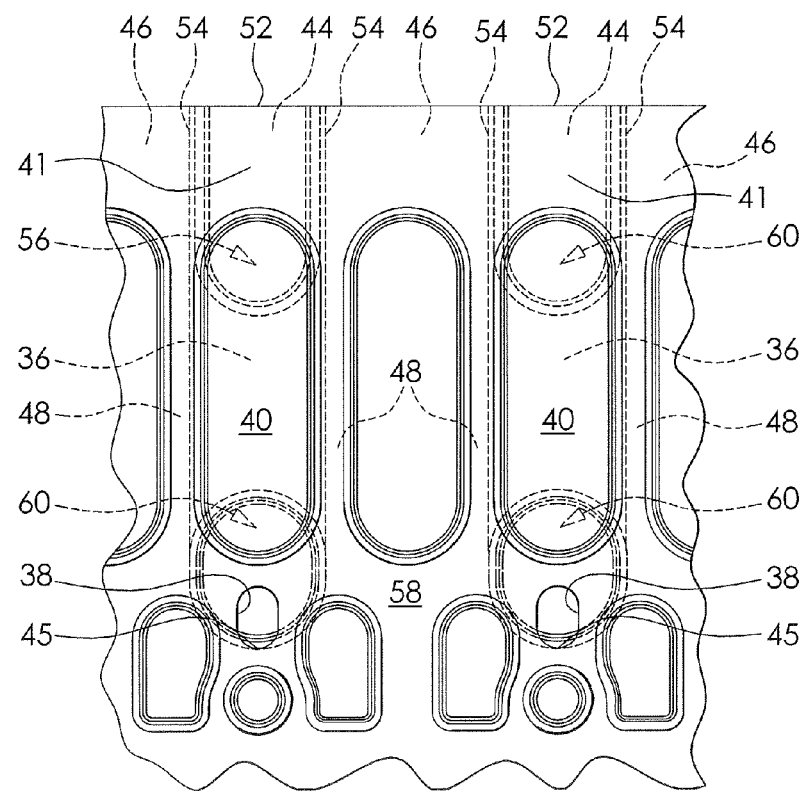
FIG. 4 is an enlarged fragmentary top plan view of the fuel cell plate illustrated in FIG. 2.
Figure 5:
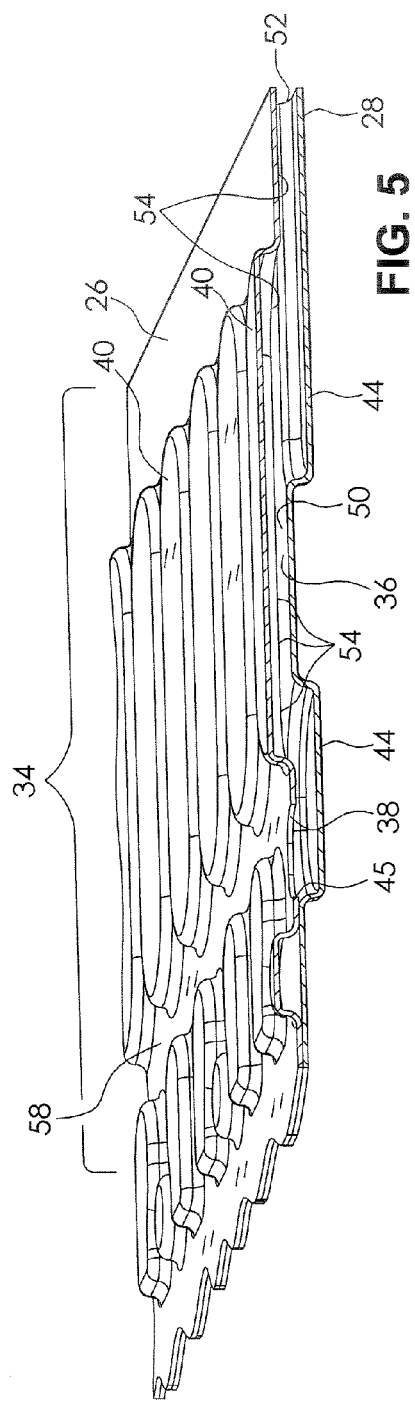
FIG. 5 is a fragmentary perspective view of the fuel cell plate illustrated in FIG. 2, showing a continuous seam between a first plate and a second plate.

FIGS. 3 and 4 show the first plate 26 to include a plurality of inlet apertures 38. The first plate 26 may also include first plate protuberances 40 and first planar portions 41. As shown in FIG. 2, the active region 30 includes a plurality of flow channels 42 which effectively distribute reactants across the active region 30. Additionally, the flow channels 42 guide water created during the electrochemical reaction towards the inactive region 32. Liquid water is moved through the active region 30 and inactive region 32 by reactant drag forces. The reactants and water enter the tunnel region 34 of the plate 12 through the inlet apertures 38. The inlet apertures 38 may be formed during plate stamping or through other secondary processes, for example. A gasket may be disposed on the first planar portion 41 of the first plate 26 or other planar portion of the plate 12. The gasket may follow a periphery of the outlet header 20 or a periphery of the plate 12. The gasket militates against leakage of the reactants and the water from the fuel cell and electrically insulates the fuel cell plate 12 from an adjacent fuel cell plate 12.

The second plate 28 includes a plurality of second plate indentations 44. The second plate indentations 44 may be formed along a linear edge of the outlet aperture 16 or may be formed annularly around a substantially circular aperture, for example. A leading edge 45 of the second plate indentation 44 may be substantially aligned with an edge of the inlet aperture 38. Upon disposing the second plate 28 adjacent the first plate 26, the second plate indentations 44 are spaced apart from the first plate 26. A plurality of contact ridges 46 between the second plate indentations 44 defines a second plate mating surface 48 in the vicinity of the second plate indentations 44. The second plate 28 may also include a plurality of second plate protuberances 50, formed adjacent the second plate indentations 44 and substantially aligned with the first plate protuberances 40. The second plate protuberances 50 provide for a cross sectional area of the conduit 36 to remain substantially constant, militating against velocity changes of a fluid moving therein.

The conduits 36 are formed by a cooperation of the second plate indentations 44, the first plate 26, inlet apertures 38, and a plurality of outlet apertures 52. The conduits 36 may also include the first plate protuberances 40 and the second plate protuberances 50. It should be understood that a contact between the first plate 26 and the second plate 28 defines a continuous seam 54 from the inlet aperture 38 to the outlet aperture 52. The continuous seam 54 between the first plate 26 and the second plate 28 can be accomplished in various ways. For example, a planar surface of the first plate 26 can meet an edge of the second plate indentations 44, a planar surface of the second plate 28 can meet an edge of the first plate protuberances 40, an edge of the first plate protuberances 40 can meet an edge of the second plate indentations 44, and the leading edge 45 of one of the second plate indentations 44 can meet an edge of one of the inlet apertures 38. The continuous seam 54 isolates each of the conduits 36 from other of the conduits 36. The outlet apertures 52 may be formed between the first plate 26 and the second plate 28. As illustrated, a terminal end of the conduit 36 forms at least a portion of the outlet aperture 52. Alternatively, the outlet aperture 52 may be singularly formed in the second plate 28. An edge of the outlet aperture 52 maintains contact with the continuous seam 54. Likewise, the inlet apertures 38 may be formed in the first plate protuberance 40, provided the inlet aperture 38 edge maintains contact with the continuous seam 54.

The conduits 36 provide fluid communication between the inlet apertures 38 and the outlet apertures 52. For example, fluid flow may include one of reactants and water movement to and from the fuel cell. The reactants may enter or exit the fuel cell during operation of the fuel cell. Water may be drained from the fuel cell by capillary flow after fuel cell operation. The discrete conduits 36 are advantageous over non-discrete conduits by preventing flow maldistribution in the tunnel region 34 and encouraging capillary flow.

Capillary flow is facilitated through the use of the discrete conduits 36 of the tunnel regions 34. The continuous seam 54 formed between the first plate 26 and the second plate 28 is an exemplary location for a process termed spontaneous wetting or spontaneous imbibition. This process, as it relates to open capillaries produced by V-shaped or triangular surface grooves, is described, in Rye et al., Langmuir, 12:555-565 (1996), hereby incorporated herein by reference in its entirety. The physical requirements to support spontaneous wetting in the corners of a flow channel are characterized by the Concus-Finn condition, $\beta+\alpha/2<90°$, where $\beta$ is a static contact angle formed between a liquid surface and a solid surface. An angle $\alpha$ is the conduit 36 corner angle, and in particular embodiments the angle formed by the intersection of the first plate 26 with the second plate 28. The static contact angle $\beta$ is a property specific to a particular surface and material that is experimentally determined, for example, by placing a liquid droplet on the surface and recording when an equilibrium condition is met where no further spreading of the droplet occurs.

Figure 6:
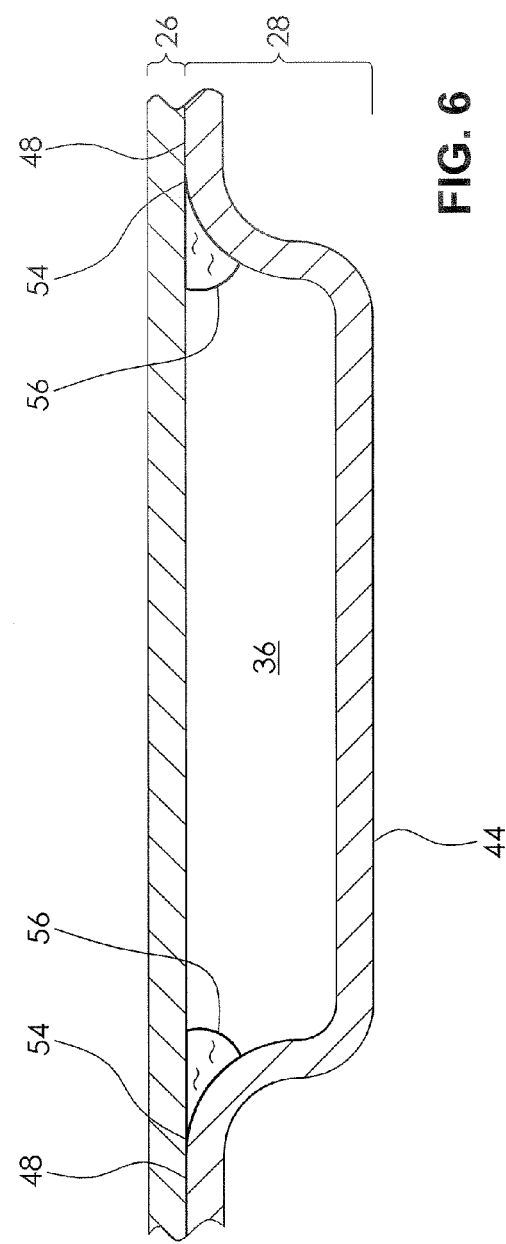
FIG. 6 is an enlarged fragmentary cross-sectional view of a conduit of the fuel cell plate illustrated in FIG. 2.

As a nonlimiting example, a rectangular channel has an $\alpha/2$ of 45°, which dictates that spontaneous wetting will occur when the static contact angle is less than 45°. As illustrated in FIGS. 3 through FIGS. 6, the intersection between the first plate 26 and the second plate 28 have a $\beta+\alpha/2<90°$, thereby satisfying the Concus-Finn condition. Illustratively, the intersection between the first plate 26 and the second plate 28 may have an acute angle. As shown in FIG. 6, spontaneous wetting along the continuous seam 54 collectively forms a continuous ligament 56 of water running from the inlet aperture 38 to the outlet aperture 52. The continuous ligament 56 facilitates a constant and uninterrupted flow of water through the conduit 36, from a pooling surface 58 of the first plate 26 to the outlet header 20. The continuous ligaments 56 may form on both sides of the conduit 36.

In use, the continuous ligament 56 facilitates removal of water from the tunnel region 34 and the pooling surface 58 after operation of the fuel cell stack 10. Upon stack shutdown, water within the fuel cell may collect in the pooling surface 58 or within the tunnel region 34 due to a removal of the drag forces and pressure of reactant flow. Water within the tunnel region 34 spontaneously wets the continuous seam 54 and forms the continuous ligament 56. Alternately, the continuous ligament 56 may be formed during operation of the fuel cell stack 10. Water on the pooling surface 58 enters the inlet aperture 38 due to one of a formation of a liquid film and a gravitational force. The water contacts the leading edge 45 and spontaneously wets the continuous seam 54. Capillary action continues to collect the water, spreading it along the continuous seam 54, forming the continuous ligament 56. Water protrudes from the outlet aperture 52, into one of the inlet header 18 and the outlet header 20 as the volume of water forming the continuous seam 54 increases. Water protruding from the outlet aperture 52 is substantially free from the capillary forces that form the continuous ligament 56. Water moves into one of the inlet header 18 and the outlet header 20 by one of boundary layer shear forces, gravitational forces, and capillary mechanisms. Water is continuously removed from the tunnel region 34 and the pooling surface 58 until the amount of water left cannot support the capillary based removal of water. Accordingly, water remaining after completion of the capillary based removal is an amount incapable of affecting fuel cell performance in sub-freezing conditions.

Flow maldistribution may occur in non-discrete conduits due to water pooling within one or more conduits. Non-discrete conduit tunnel regions may include a conduit header, bridged conduits, or other shared plate features located before the conduit terminates in the outlet aperture 52. These features, which may be relatively large compared to the size of the conduit itself, cause the flow velocity of reactants through the conduits to be significantly reduced. Liquid water may pool in areas having a reduced flow velocity, causing reactant gasses to bypass portions of conduits, whole conduits, or reduced flow velocity areas. Discrete conduit tunnel regions provide a substantially constant reactant flow velocity, militating against water pooling, reactant bypassing, and flow variation between the fuel cells.

A cross sectional area of the conduits 36 may be selected to facilitate the removal of liquid water from the tunnel region 34. The conduits 36 may have a substantially constant cross-sectional area for example, allowing flow velocity of the fluids moving therein to remain relatively constant. A relatively constant flow velocity in the conduit 36 militates against water from pooling. Alternately, the conduits 36 may have a decreasing cross-sectional area. A first cross-sectional area near the inlet aperture 38 may have a greater cross-sectional area than a second cross-sectional area near the outlet apertures 52. The conduits 36 having a decreasing cross-sectional area likewise facilitate removal of liquid water therefrom by increasing the flow velocity in the conduit 36 as the fluid moves along a length of the conduit 36 towards the outlet aperture 52.

A plurality of transition portions 60 of the conduits 36 may be formed by an overlap of the first plate protuberances 40 and the second plate indentations 44, as shown in FIGS. 3 and 4. The first plate protuberances 50 and the second plate indentations 44 are formed accordingly to maintain the substantially constant or decreasing cross-sectional area of the conduits 36 in the transition portions 60.

It should be appreciated that the present fuel cell plate 12 is cost-effective due to elimination of a need for additional components, such as water transport structures, surface coatings, and the like. It is surprisingly found that the fuel cell plate 12 is effective in militating against water accumulation in the tunnel region 34 of the fuel cell and reactant maldistribution. The fuel cell plate 12 thereby maximizes starting performance of the fuel cell in sub-freezing temperatures.

Figure 7:
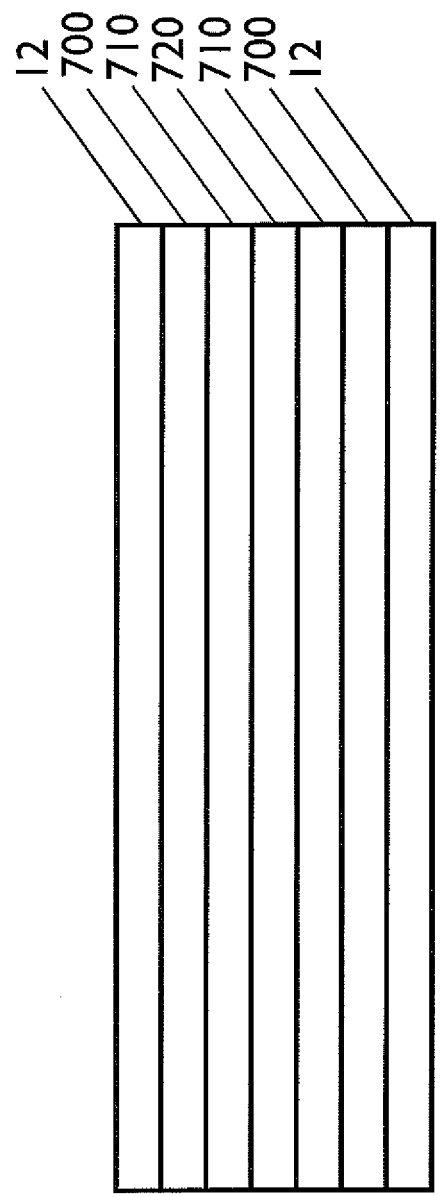
FIG. 7 is a schematic elevational view of an electrolyte membrane, a pair of electrodes, and porous diffusion media disposed between a pair of fuel cell plates.

Referring now to FIG. 7, an electrolyte membrane 720, a pair of electrodes 710, and porous diffusion media 700 are shown disposed between a pair of fuel cell plates 12. The electrolyte membrane 720 and electrodes 710 can be referred to as a membrane-electrolyte-assembly (MEA).

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell plate comprising:
   a first plate having an inlet aperture; and
   a second plate directly contacting the first plate and forming a conduit therebetween, the conduit in fluid communication with the inlet aperture and an outlet aperture of the fuel cell plate, the conduit having a continuous seam formed between an intersection of the first plate and the second plate, the intersection having an acute angle to facilitate a transport of water to the outlet aperture, the conduit located in a tunnel region of the fuel cell plate and fluidly coupled to a flow channel configured to distribute a reactant across an active region of the fuel cell plate, the inlet aperture fluidly coupled to the flow channel via the conduit;
   wherein the second plate comprises an indentation to form a portion of the conduit, wherein the indentation is indented away from the first plate, at least a portion of the indentation is juxtaposed with the inlet aperture, and the inlet aperture has an edge positioned adjacent a leading edge of the indentation to form a portion of the continuous seam.

2. The fuel cell plate of claim 1, wherein the second plate contacts the first plate and forms a plurality of discrete conduits.

3. The fuel cell plate of claim 1, wherein the outlet aperture is formed between the first plate and the second plate.

4. The fuel cell plate of claim 1, wherein the outlet aperture is formed in one of the first plate and the second plate.

5. The fuel cell plate of claim 1, wherein the first plate includes a first protuberance and the second plate includes a second protuberance, the first protuberance and the second protuberance aligned with each other, wherein the conduit has a substantially constant cross sectional area to militate against velocity changes of a fluid moving through the conduit.

6. The fuel cell plate of claim 1, wherein the conduit has a first cross sectional area adjacent the inlet aperture and a second cross sectional area adjacent the outlet aperture, the first cross sectional area greater than the second cross sectional area.

7. The fuel cell plate of claim 1, wherein the inlet aperture is formed in a protuberance disposed on the first plate.

8. The fuel cell plate of claim 1, wherein an overlap of a protuberance of the first plate and the indentation of the second plate form a transition portion of the conduit maintaining a substantially constant cross-sectional area of the conduit.

9. The fuel cell plate of claim 1, wherein one of the first plate and the second plate include a substantially planar portion encircling an outlet port formed in one of the first plate and the second plate.

10. The fuel cell plate of claim 9, wherein the substantially planar portion of one of the first plate and the second plate cooperate with one of the first plate and the second plate to form a portion of the conduit.

11. A fuel cell comprising:
    a pair of fuel cell plates, one of the fuel cell plates including a first plate having an inlet aperture, and a second plate directly contacting the first plate and forming a conduit therebetween, the conduit in fluid communication with the inlet aperture and an outlet aperture of the fuel cell plate, the conduit having a continuous seam formed between an intersection of the first plate and the second plate, the intersection having an acute angle to facilitate a transport of water to the outlet aperture, the conduit located in a tunnel region of the fuel cell plate and fluidly coupled to a flow channel configured to distribute a reactant across an active region of the fuel cell plate, the inlet aperture fluidly coupled to the flow channel via the conduit, wherein the second plate comprises an indentation to form a portion of the conduit, wherein the indentation is indented away from the first plate, at least a portion of the indentation is juxtaposed with the inlet aperture, and the inlet aperture has an edge positioned adjacent a leading edge of the indentation to form a portion of the continuous seam;
    a first protuberance of the first plate and a second protuberance of the second plate aligned with each other in the conduit, wherein the conduit has a substantially constant cross sectional area to militate against velocity changes of a fluid moving through the conduit; and
    an electrolyte membrane and a pair of electrodes disposed between the pair of fuel cell plates.

12. The fuel cell of claim 11, wherein the second plate contacts the first plate and forms a plurality of discrete conduits.

13. The fuel cell of claim 11, wherein an overlap of the protuberance of the first plate and the indentation from a portion of the conduit, maintaining the substantially cross sectional area of the conduit.

14. The fuel cell of claim 11, wherein one of the first plate and the second plate include a substantially planar portion encircling an outlet port formed in one of the first plate and the second plate.

15. The fuel cell of claim 14, wherein the substantially planar portion of one of the first plate and the second plate cooperate with one of the first plate and the second plate to form a portion of the conduit.

16. A fuel cell stack comprising:
    a plurality of fuel cells, one of the cells having a pair of fuel cell plates, one of the fuel cell plates including a first plate having an inlet aperture, and a second plate directly contacting the first plate and forming a conduit therebetween, the conduit in fluid communication with the inlet aperture and an outlet aperture of the fuel cell plate, the conduit having a continuous seam formed between an intersection of the first plate and the second plate, the intersection having an acute angle to facilitate a transport of water to the outlet aperture, the conduit located in a tunnel region of the fuel cell plate and fluidly coupled to a flow channel configured to distribute a reactant across an active region of the fuel cell plate, the inlet aperture fluidly coupled to the flow channel via the conduit, wherein the second plate comprises an indentation to form a portion of the conduit, wherein the indentation is indented away from the first plate, at least a portion of the indentation is juxtaposed with the inlet aperture, and the inlet aperture has an edge positioned adjacent a leading edge of the indentation to form a portion of the continuous seam;

an overlap of a protuberance of the first plate and the indentation of the second plate forming a transition portion of the conduit, the transition portion maintaining a substantially constant cross-sectional area of the conduit; and an electrolyte membrane and a pair of electrodes disposed between the pair of fuel cell plates.

* * * * *